July 22, 1952        A. BLANCHARD        2,604,509

NONSPINNING ARMORED ELECTRIC CABLE

Filed April 6, 1948

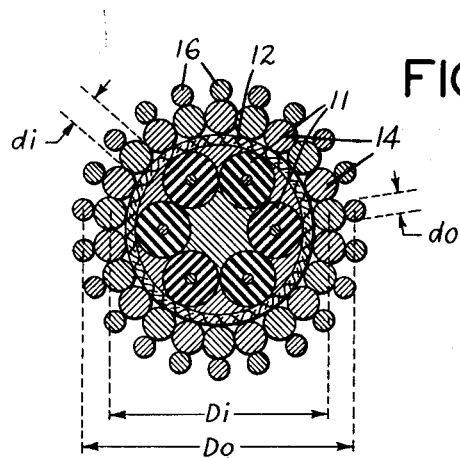

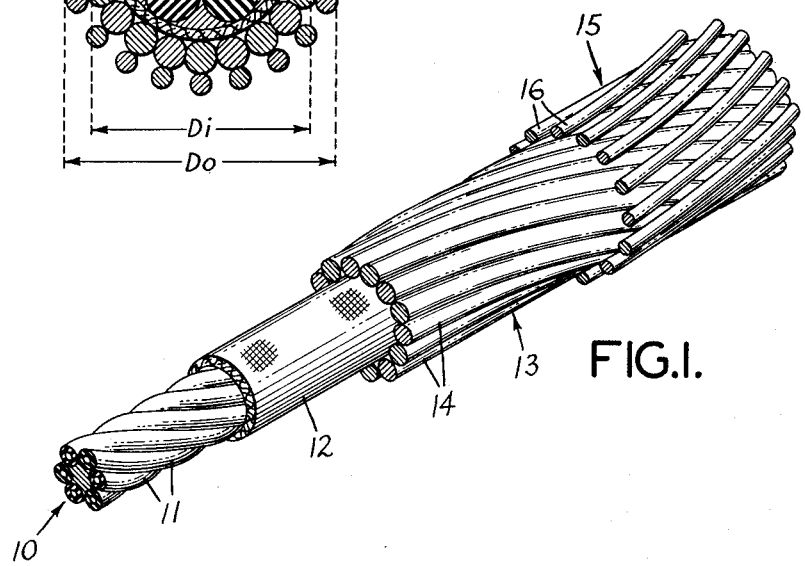

$$\frac{\sin \alpha_o}{\sin \alpha_i} = \sqrt{\frac{\frac{\Delta L}{L} + \frac{\Delta D}{D_i}}{\frac{\Delta L}{L} + \frac{\Delta D}{D_o}}}$$

$\alpha_o$ = LAY ANGLE OF OUTER ARMOR 15
$\alpha_i$ = LAY ANGLE OF INNER ARMOR 13
$L$ = LENGTH OF CABLE
$\Delta L$ = CHANGE OF CABLE LENGTH UNDER LOAD
$\Delta D$ = CHANGE OF CABLE DIAMETER UNDER LOAD

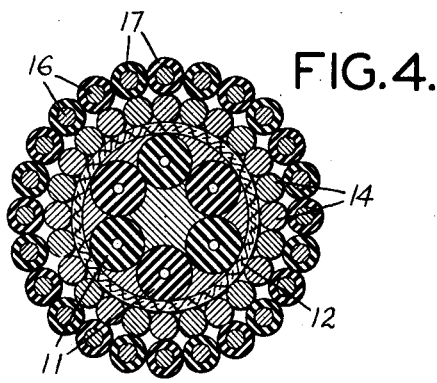

FIG.4.

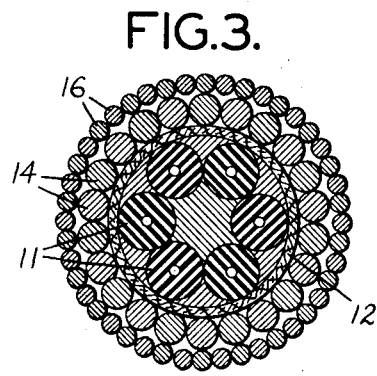

FIG.3.

*INVENTOR.*
ANDRE BLANCHARD
BY
Campbell, Brumbaugh & Free
*HIS ATTORNEYS.*

Patented July 22, 1952

2,604,509

UNITED STATES PATENT OFFICE 2,604,509

NONSPINNING ARMORED ELECTRIC CABLE

Andre Blanchard, Houston, Tex., assignor to Schlumberger Well Surveying Corporation, Houston, Tex., a corporation of Delaware Application April 6, 1948, Serial No. 19,281

5 Claims. (Cl. 174—108)

1

The present invention relates to armored cables and more particularly to armored electrical cables of the type employed in operations in deep oil wells or bore holes drilled into the earth, although they are not limited to such use.

Heretofore, electric cables designed for operations such as electrical logging, gun perforating and the like in deep oil wells, have usually comprised a core including a group of helically wound, short lay, insulated conductors surrounded by two protective, load carrying layers of steel armor, the layers being wound in opposite directions around the core.

Armored cables of the type described above, have not been found entirely satisfactory, principally because they have been designed for substantially equal stresses in the several layers of armor. Accordingly, the breaking strength of the cable is at a maximum, but it is practically impossible to balance the torques produced in the several layers at different loads. As a result, the torque developed in the outer layer of armor under load is greater than that developed in the inner layer. Hence, the cable tends to rotate in the direction to wind up the inner armor and unwind the outer. This tends to crush the core and seriously unbalances the relative stresses in the several layers of armor so that the total breaking strength of the cable is lowered. In an actual case, a reduction of 30% in the total breaking strength was observed.

Further, when a cable of this type supports an apparatus for making electrical measurements at different depths in the bore hole, it has been observed that spurious effects are sometimes produced by the metallic cable armor rubbing the sides of the hole.

It is an object of the present invention, accordingly, to provide a new and improved armored cable which is substantially free from any tendency to spin under load.

Another object of the invention is to provide a new and improved nonspinning armored cable of the above character in which both the stresses and the torques developed in the several layers of armor under load are substantially equalized, so that each layer carries its proportionate share of the load.

A further object of the invention is to provide a new and improved armored cable of the above character which is resistant to abrasion and corrosion and is insulated from the well casing.

Still another object of the invention is to provide a new and improved armored cable of the above character which has a relatively low specific gravity.

2

The objects of the invention may be attained by so proportioning the size and lay of the strands forming the several layers of armor that the resultant torque applied to the cable is substantially zero for different loads while the stresses in each of the layers are substantially equal. In one modification, this result may be achieved in part by coating the several strands in the outer layer of armor with a suitable, tough, essentially non-load carrying material which may have good abrasive resistant qualities. If it is desired to insulate the cable from a metallic casing in the bore hole, for example, the coating may also have electrical insulating properties.

Additional objects and advantages of the invention will be apparent from the following detailed description, taken in conjunction with the accompanying drawings in which:

Fig. 1 is a view in perspective of a double armored electric cable constructed according to the invention with each layer broken away successively to show the details of the cable construction;

Fig. 2 is a view in transverse section of the cable shown in Fig. 1;

Fig. 3 is a view in transverse section through a modification in which a sufficient number of relatively small strands are used in the outer armor substantially to cover the inner armor; and Fig. 4 is also a view in transverse section through another modification in which the strands in the outer armor are covered with a suitable coating so as to cover the inner armor.

In the typical embodiment of the invention shown in Figs. 1 and 2, the cable comprises, for example, a core 10 which may include one or more insulated electrical conductors 11 formed in a short lay helix, for example. While six conductors 11 are shown in Figure 1, obviously any desired number may be employed. Preferably, the conductors 11 are covered by a layer 12 of any suitable material such as textile braid, plastic or tape wrapping, which serves to hold them in place and insures an essentially circular form for the core 10.

It will be understood that the core 10 comprising the insulated conductors 11 is deformable so that its diameter tends to become reduced when it is subjected to external pressure as when the cable is under load.

Surrounding the core 10 is an inner layer of armor 13 comprising a plurality of metal strands 14 which are preferably preformed and which are wound in a helix about the core 10. The pitch of the strands 14 should preferably be so chosen that the layer of armor 13 substantially covers the core 10. While twenty-two strands 14 are shown in Figs. 1 and 2, the exact number employed in any case will depend upon the strength and lay desired. In electrical logging operations the cables employed usually have from eighteen to twenty-eight strands in the inner layer of armor. Wound on top of the inner layer 13 is an outer layer 15 of armor comprising a plurality of metal strands 16 wound in the opposite direction to the strands 14.

In accordance with the invention, the size and lay of the several strands forming the layers 13 and 15 of armor are so proportioned that the stresses in the layers 13 and 15 are substantially equal while the resultant torque applied to the cable at any load is substantially zero. The design details of the core 10 depend on the specific properties, i. e. resistance, mechanical strength, resistance to corrosion, etc., desired, and are usually known in advance. Also, the design details for the inner layer 13 of armor are approximately known. In general, it is sufficient to use a reasonable number of strands for the inner armor layer 13 of such size as substantially to cover the core 10. The diameter of the strands 14 is such that they can be handled conveniently by commercially available cable making machinery, and also the strands are large enough so that they will remain in their proper position when wound on the core 10.

Having selected the strand size and the number of strands for the inner layer 13 of armor, the outer layer 15 is then designed so that the torques developed by the two layers are equalized as well as the stresses. It can be shown that the ratio between the torques in two layers of armor, each having the same number of strands, in a cable of the type shown in Fig. 1, can be expressed as follows:

$$\frac{T_0}{T_i} = \frac{d_0^2 D_0 \sin \alpha_0}{d_i^2 D_i \sin \alpha_i} \frac{S_0}{S_i} \quad (1)$$

where $T_i$ is the torque developed by the inner armor 13, $T_0$ the torque developed by the outer armor layer 15, $S_i$ is the stress in the inner armor layer 13, $S_0$ the stress in the outer layer armor, 15, $d_0$ the diameter of each strand 16 in the outer armor layer 15, $d_i$ is the diameter of each strand 14 in the inner armor layer 13, $D_0$ is the pitch diameter of the outer armor layer 15, $D_i$ is the pitch diameter of the inner armor layer 13, $\alpha_0$ is the angle between each strand 16 in the outer armor layer 15 and the axis of the cable, and $\alpha_i$ is the angle between each strand 14 in the inner armor layer 13 and the axis of the cable.

Further, it can be demonstrated that the stresses in the inner and outer armor layers 13 and 15, respectively, are equal when:

$$\frac{\sin \alpha_0}{\sin \alpha_i} = \sqrt{\frac{\frac{\Delta L}{L} + \frac{\Delta D}{D_i}}{\frac{\Delta L}{L} + \frac{\Delta D}{D_0}}} \quad (2)$$

Where
$\Delta D$=the reduction in diameter for both armors for a given cable loading. (As the two armors are and remain in contact, the reduction in diameter is the same for both.)
$\Delta L$=the elongation in the cable for a given cable loading and the remaining symbols are as defined above.

Since the pitch diameter $D_0$ of the outer armor layer 15 will always be greater than the pitch diameter of the inner armor, it will be apparent from Equation 2 that $\alpha_0$ must be greater than $\alpha_i$ if the stresses in the two armor layers are to be equal.

Assuming that the number of strands in the inner and outer layers of armor is the same, as is frequently the case, a value can be obtained for $d_0^2 D_0$ by setting the left hand side of Equation 1 equal to unity, and also $S_0 = S_i$ and substituting the known values for $d_i$, $D_i$ and $\alpha_i$, selecting a value for $\alpha_0$ that is slightly greater than $\alpha_i$, and solving for $d_0^2 D_0$. Definite values for $d_0$ and $D_0$ can thus be determined and trial calculations will show whether or not Equation 2 is satisfied. If not, adjustment may be made until the equations are satisfied.

If the number of strands in the inner and outer layers or armor are not the same, the equations defining the torque tending to unwind the several layers of armor must be taken into consideration. It can be shown that the torque tending to unwind the outer layer 15 of armor is given by the relation:

$$T_0 = \frac{n_0 \eta d_0^2 D_0 S_0 \sin \alpha_0}{8} \quad (3)$$

while the torque tending to unwind the inner layer of armor is given by the relation:

$$T_i = \frac{n_i \eta d_i^2 D_i S_i \sin \alpha_i}{8} \quad (4)$$

where $n_0$ is the number of strands in the outer layer of armor, $n_i$ is the number of strands in the inner layer of armor and the remaining symbols have the same meanings as in Equations 1 and 2 above.

As stated, the number and the size of the strands 14 in the inner layer 13 of armor will generally be known in advance, as well as the angle which each strand makes with the axis of the cable. Hence, the number and size of the strands in the outer layer of armor 15 and the angle between the strands and the axis of the cable can readily be determined from Equations 3 and 4 above, setting $S_0$ equal to $S_i$ and $T_0 = T_i$.

By way of example, the procedure to be followed in designing a typical cable suitable for well logging operations is outlined briefly below. It will be assumed, for example, that the diameter of the core is to be .32 inch while the inner layer of armor 13 is to comprise twenty-four strands each having a diameter of .044 inch and a pitch diameter of .37 inch, each strand making an angle of 20° with the axis of the cable. For a first approximation, let it be assumed further that the number of strands to be used in the outer layer of armor 15 is the same as in the inner layer 13.

First, $\alpha_0$ is given a value slightly greater than the known value of $\alpha_i$, say 22°, for example. The amount by which $\alpha_0$ exceed $\alpha_i$ can vary, but it will rarely have to exceed 5°. Then, by substituting the known values of $d_i$, $D_i$, $\alpha_0$ and $\alpha_i$ in Equation 1 above, the diameter $d_0$ of the strands in the outer layer of armor 15 may be selected. Thus, the outer layer of armor 15 may comprise twenty-four strands 16 of .038 inch diameter wire, each strand being disposed at an angle of 22° with respect to the axis of the cable.

If, in the cable so designed, the outer armor layer 15 does not cover the inner layer 13, as shown in Fig. 2, the number of strands 16 may be increased and the wire size reduced as in Fig. 3 so that the outer armor will completely cover the inner armor and Equation 1 will be satisfied.

Instead of increasing the number of strands to cover the inner armor layer 13, each of the strands 16 in the outer layer 15 of armor may be provided with a non-load carrying coating of sufficient thickness to effect this result. Thus, by coating the .038 inch diameter strands 16 of Fig. 2 with an .008 inch layer 17 of suitable material to increase their diameter to .054 inch, as in Fig. 4 substantially complete coverage of the inner layer of armor 13 can be obtained.

Figure 4 shows an individual coating for each strand of the outer armor. The same advantages may be obtained by extruding, or otherwise forming, a continuous layer of the coating material about the inner armor, the strands 16 being imbedded in the coating. This process also results in a smooth, round cable which generally has better wearing qualities.

The properties of the coating for the strands will depend upon the specific characteristics desired for the cable, as indicated above. In general it should be tough and relatively resistant to abrasion, but it can be of low tensile strength, since it does not carry any of the load. If the cable should be insulated from any casing that may be in a well, a coating having suitable insulating properties may be provided for this purpose. Or, if a cable of minimum density is desired, a coating material having a density less than that of steel should be employed.

Suitable coating materials may comprise any of the so-called plastic compounds with or without inert fillers such as synthetic fiber forming polymeric amides having a protein like chemical structure, acetol type polyvinyl resins, or rubber, for example. If electrical insulating properties are not essential, a metal having a low modulus of elasticity might be employed as the coating material. The coating may be applied in any conventional manner such as by extrusion, dipping, polymerization or electrolytic deposition.

The provision of a coating for the cable is of special importance in connection with cables that are tapered from one end to the other so as to have different load carrying properties at different points along their length. Heretofore such cables have not been satisfactory in certain applications. When wound on a spool on a winch, gaps are left between turns on the top layers, which is undesirable. In accordance with the invention, this difficulty can be avoided by applying a coating to the outside of such cable having a thickness varying inversely with the variations in cable diameter, so that the cross-sectional area of the cable is substantially uniform along its length.

A coating of varying thickness might also be helpful as a means of reducing abrasion in a cable of uniform cross section. Since the lower part of the cable travels a greater distance along the bore hole than the upper part of the cable, the abrasion problem can be alleviated by applying a coating of maximum thickness to the portion of the cable where the wear is greatest and reducing the thickness of the coating along the cable in proportion to the expected wear at each portion thereof.

From the foregoing, it will be apparent that the invention provides a superior armored cable construction which is of special utility for use in oil wells, although it is not limited to this field. By proportioning the sizes and lays of the strands in the several layers of armor in such fashion that the resultant torque applied to the cable at all loads is substantially zero while the stresses in the layers of armor are substantially equal, spinning of the cable under load is substantially eliminated. Hence, cables constructed according to the invention can be used for depth measurements without introducing errors due to unwinding of the layers of armor under load. Further, by coating the strands with a suitable coating material, wear, due to abrasion, can be minimized and the density of the cable can be substantially reduced or the cable can be easily insulated from any casing in a well.

It will be understood that the specific embodiments described above are susceptible of considerable modification within the spirit of the invention. While, in the representative embodiments described, electrical conductors have been shown in the core and only two layers of armor have been provided, obviously the invention can be applied to cables which do not include electrical conductors and which may have any number of concentric layers of armor, as desired. It can also be applied to cables utilizing strands having shapes other than round for the layers of armor.

The modifications described herein are intended to be merely illustrative of the invention and not restrictive, and they are susceptible of numerous changes in form and detail within the scope of the appended claims.

I claim:

1. In an armored cable, the combination of a non-load carrying, deformable core, an even number of concentric, helically wound load supporting layers of armor surrounding the core, alternate layers being wound in opposite directions with the outer layers having slightly greater lay angles than the inner layers, and the total cross-sections of alternate layers of armor being approximately in inverse ratio to the radii of said alternate layers of armor, such that the torques and stresses in said layers of armor are substantially equalized when the cable is under load.

2. An armored electric cable comprising a central, non-load carrying, deformable core containing at least one insulated electrical conductor, an inner armor of metallic strands over said core, the lay of said strands being such that said inner armor substantially covers the core, and an outer armor of substantially the same number of metallic strands as said inner armor but of opposite lay over said inner armor, the lay angle of the outer armor being slightly greater than the lay angle of the inner armor, and a number of the strands in said outer armor being coated with a sufficient thickness of relatively tough, non-load supporting material as to insure substantially complete coverage of said inner armor by the outer armor, the total cross-sections of the inner and outer armors being approximately in inverse ratio to the radii of said inner and outer armors such that the streses in said cable armors are equal and the torques developed in said armors when the cable is loaded are substantially equal and opposite.

3. A nonspinning, armored electric cable for use in bore holes comprising a non-load carrying, deformable core containing a plurality of insulated electrical conductors, an inner armor over said core, said armor comprising a plurality of individual load supporting strands formed in a helix about the core and having a lay such that said inner armor substantially covers the core, an outer armor over said inner armor, said outer armor comprising a plurality of individual load supporting strands helically wound in a direction opposite to that of the strands of the inner armor, the lay of the outer armor strands being such that the outer armor substantially covers the inner armor, the lay angle of the outer armor being greater than the lay angle of the inner armor, and the total cross-sections of the inner and outer armors being approximately in inverse ratio to the radii of said inner and outer armors such that when tension is applied to the cable, the stresses in the two armors are approximately equal and the torques developed in the two armors are substantially equal and opposite.

4. A nonspinning armored cable for use in bore holes comprising a non-load carrying, deformable core, and inner and outer load supporting armors helically wound in opposite directions over the core, each of the armors being formed of approximately the same number of strands, the diameters, pitch diameters, and the lay of the strands in the armors being such that the product of the strand diameter squared, the pitch diameter, and the sine of the angle between each strand of the outer armor and the axis of the cable is aproximately equal to the product of the strand diameter squared, the pitch diameter and the sine of the angle between each strand of the inner armor and the axis of the cable, and the lay angle of the outer armor being slightly greater than the lay angle of the inner armor, whereby the stresses in the two armors are equal and the torques in the two armors are equal and opposite when the cable is in tension.

5. An armored cable for use in bore holes comprising a deformable core, and inner and outer load supporting armors helically wound in opposite directions over the core, each of the armors being formed of approximately the same number of strands and so designed that $$\frac{\sin \alpha_0}{\sin \alpha_i} = \sqrt{\frac{\frac{\Delta L}{L} + \frac{\Delta D}{D_i}}{\frac{\Delta L}{L} + \frac{\Delta D}{D_0}}}$$

where $\alpha_0$ is the lay angle of the outer armor $\alpha_i$ is the lay angle of the inner armor, $L$ is the original length of the cable, $\Delta L$ is the change of length of the cable caused by a given load, $D_0$ is the original diameter of said outer armor, $D_i$ is the original diameter of said inner armor, and $\Delta D$ is the change in diameter of said outer armor.

ANDRE BLANCHARD.

REFERENCES CITED

The following references are of record in the file of this patent:

UNITED STATES PATENTS

| Number | Name | Date |
|---|---|---|
| 728,399 | Kirsch | May 19, 1903 |
| 1,700,476 | Gilbert | Jan. 29, 1929 |
| 1,738,234 | Curtis | Dec. 3, 1929 |
| 1,919,509 | Grobl | July 25, 1933 |
| 2,463,590 | Arutunoff | Mar. 8, 1949 |